(12) United States Patent
Ha

(10) Patent No.: US 7,756,754 B2
(45) Date of Patent: Jul. 13, 2010

(54) METHOD FOR PROVIDING ON-LINE SHOPPING SEARCH SERVICE AND SYSTEM THEREOF

(75) Inventor: Woo Seong Ha, Kimpo-si (KR)

(73) Assignee: NHN Corporation, Seongnam-Si, Kyunggi-Do (KR)

( * ) Notice: Subject to any disclaimer, the term of this patent is extended or adjusted under 35 U.S.C. 154(b) by 299 days.

(21) Appl. No.: 11/593,325

(22) Filed: Nov. 6, 2006

(65) Prior Publication Data

US 2007/0055579 A1 Mar. 8, 2007

Related U.S. Application Data

(63) Continuation of application No. PCT/KR2005/001303, filed on May 4, 2005.

(30) Foreign Application Priority Data

May 4, 2004 (KR) ...................... 10-2004-0031250

(51) Int. Cl.
*G06Q 30/00* (2006.01)
(52) U.S. Cl. .......................... 705/26; 705/37
(58) Field of Classification Search ................... 705/26, 705/37
See application file for complete search history.

(56) References Cited

U.S. PATENT DOCUMENTS 6,073,112 A 6/2000 Geerlings 6,076,070 A 6/2000 Stack
2003/0167209 A1* 9/2003 Hsieh .......................... 705/26

FOREIGN PATENT DOCUMENTS

| JP | 2002-024605 A | 1/2002 |
|---|---|---|
| JP | 2002-056218 A | 2/2002 |
| JP | 2002-074130 A | 3/2002 |
| JP | 2002-269392 | 9/2002 |
| JP | 2003-085302 A | 3/2003 |
| JP | 2003-223572 A | 8/2003 |
| JP | 2003-281436 A | 10/2003 |
| JP | 2004-086548 A | 3/2004 |
| KR | 10-2000-0049795 A | 8/2000 |
| KR | 10-2001-0000612 A | 1/2001 |
| KR | 10-2002-0029580 A | 4/2002 |

OTHER PUBLICATIONS

An office action issued Jun. 26, 2004 in Korean Patent Application No. 10-2004-0031250.
Notice of Allowance, Dated Dec. 22, 2009, for Corresponding Japanese Application 2007-511284, 3 Pages.

* cited by examiner

*Primary Examiner*—James Zurita
(74) *Attorney, Agent, or Firm*—Knobbe, Martens, Olson & Bear LLP

(57) ABSTRACT

The present invention relates to method and system for providing an online shopping search service, and more particularly, to method and system for providing an online shopping search service, which constructs a database systematically including information about a product registrant, a product registered by the product registrant and a seller who wants to sell the registered product, and performs operations associated with an online shopping search service by using the database.

13 Claims, 13 Drawing Sheets

| IDENTIFICATION INFO ||
|---|---|
| PRODUCT REGISTRANT IDENTIFIER | PRODUCT IDENTIFIER |
| wisjjang | a11112 |
|  | a11113 |
|  | a11114 |
| kaori | b11113 |
|  | ... |
| ... | ... |

FIG. 3A

| PRODUCT IDENTIFIER (OR IDENTIFICATION INFO) | PRODUCT INFO ||||| |
|---|---|---|---|---|---|
| | COST INFO | PAYMENT | REGISTRATION PERIOD | PRODUCT REGISTER IDENTIFIER | |
| a11112 (or wisjjang_a11112') | Free delivery | Credit card available | 2004.02.01 ~ 2004.08.01 | | ⋮ |
| a11113 | Conditional free delivery | Credit card installment available | ⋮ | ⋮ | ⋮ |
| a11114 | Paid delivery | ⋮ | ⋮ | ⋮ | ⋮ |
| ⋮ | ⋮ | ⋮ | ⋮ | ⋮ | ⋮ |

FIG. 3B

| PRODUCT IDENTIFIER (OR IDENTIFICATION INFO) | SELLER IDENTIFIER | URL INFO OF WEB PAGE FOR SALES OF PRODUCTS | COST INFO |
|---|---|---|---|
| a11112 | posse | http://www.zeromarket.com/new_event/newEventMaker.jsp?getEvent=40206_zero_nasan.html&partner_id=NAVER | 300,000 won |
| | corius | http://www.interpark.com/malls/main/leisure/event/0419inline.html | 200,000 won |
| | ... | ... | ... |
| a11113 | | | |
| ... | | | |

FIG. 3C

Fashion, clothing> women's wear> pants

Health>sports>fitness

Fashion, merchandise> wallets>men's wallets>brands>brand new

...
...

SEARCH PRODUCT CATEGORY

SEARCH MODEL NAME: | EX-Z4 | SEARCH

SEARCH MANUFACTURER: | CASIO | SEARCH

SPONSOR LINK

| SHOPPING MALL | SELLING PRICE | | |
|---|---|---|---|
| D market | 456,000 won | ------ | AD |
| F market | 465,000 won | ------ | AD |
| ------ | ------ | | |
| ------ | ------ | | |

SEARCH RESULTS

| SHOPPING MALL | SELLING PRICE | |
|---|---|---|
| A market | 446,000 won | ------ |
| B market | 465,000 won | ------ RECOMMENDING SHOPPING MALLS |
| ------ | ------ | |
| ------ | ------ | |

FIG. 7

METHOD FOR PROVIDING ON-LINE SHOPPING SEARCH SERVICE AND SYSTEM THEREOF

CROSS-REFERENCE TO RELATED APPLICATIONS

This application is a continuation application under 35 U.S.C. § 365(c) of International Application No. PCT/KR2005/001303, filed May 4, 2005, designating the United States, which was published in English as WO 2005/111886 A1 on Nov. 24, 2005. This application further claims for the benefit of the earlier filing dates under 35 U.S.C. § 365(b) of Korean Patent Application No. 10-2004-0031250 filed May 4, 2004. This application incorporates herein by reference the International Application No. PCT/KR2005/001303 and the Korean Patent Application No. 10-2004-0031250 in their entirety.

BACKGROUND

1. Field

The present invention relates to method and system for providing an online shopping search service.

2. Background

As the Internet is widely distributed, now product sellers can construct an online virtual market, which is an online shopping mall. Also, Internet users can purchase any particular product or goods through the virtual market without visiting stores in person. Thanks to the appearance of such online shopping mall, now, users can save time and money by direct purchase plans, such as personal visit, an advance order, and the like. A lot of users use online shopping malls because of the above advantages. Thus, various online shopping malls are entering into the virtual market.

However, an Internet shopping mall is being operated in such a manner that products are supplied by product suppliers and the products are directly sold to purchasers. In this type of internet shopping malls, there is a problem that product suppliers have to make efforts to open a store by individually contacting with a plurality of Internet shopping malls. Also, there is another problem that an operator of the Internet shopping mall has to take trouble since procedures of determining a product to sell at the Internet shopping mall and making a contract with a product supplier who supplies the product are not coordinated.

In order to solve the aforementioned problems, Korean Patent Application No 10-2001-0074164 (Publication Number 2003-0043144) discloses a unified merchandising system using Internet, which can connect a supplier supplying products with an Internet shopping mall selling the products.

The merchandising system comprises a plurality of supplier servers, a plurality of shopping mall servers, "a merchandising server", a purchaser terminal and a financial server. The supplier servers provide product information via the Internet. The shopping mall servers display the product information on a web page having a sale channel via the Internet. "The merchandising server" is constructed via the Internet between the plurality of supplier servers and the plurality of shopping mall servers and connects the supplier servers to the shopping mall servers. The purchaser terminal transmits purchase and payment information to the shopping mall servers in order to enable a user to purchase a product corresponding to product information displayed at the plurality of shopping mall servers. The financial server, connected to the purchaser terminal, the shopping mall servers, the merchandising server and the supplier servers through the Internet, performs a payment procedure.

Even in case of using the merchandising system, certain problems in the Internet shopping mall service still remain. That is, i) the operator of the Internet shopping mall has to fully review each product information provided from the merchandising server, make a request for opening a store and receive authentication. ii) Although a plurality of shopping mall servers and a plurality of supplier servers are connected to the merchandising server, a user who wants to purchase a product cannot be provided with a web search service for each product being sold at the shopping mall. iii) It is impossible to provide the product supplier or the operator of the Internet shopping mall with a statistical service about a current sales state of one or more products registered by a plurality of product suppliers or that of a product at the shopping mall server which is opened via the merchandising server. iv) A procedure of processing product information into data recorded in the product database has to be fully performed on a side managing the merchandising server, in which the product information is provided by each of product suppliers. v) Even in case that the operator of the Internet shopping mall selects a product to sell, the procedure of manufacturing a web page for sales of products has to be performed by the operator.

Also, there may be a method of charging a shopping mall operator who has opened a store at a web site, based on a fixed cost or the number of products registered by the shopping mall operator. The web site is operated by an online shopping search service server. Thus, the shopping mall operator has to pay money despite of whether a registered product is actually exposed to a user, if exposed, the number of exposures, or the number of selections from the user with respect to the registered product, for example, the number of clicks, or the like. According to such charging method, although shopping mall operators pay the same amount of money, there is a problem that unbalance between shopping mall operators having a big opening effect and shopping mall operators having a small opening effect. Also, there is another problem that an online shopping search service operator cannot make a profit since he/she cannot further charge the shopping mall operator having a bigger opening effect.

Thus, there is required the advent of new technology, constructing a regular and integrative database with respect to products registered by a plurality of product registrants, readily providing a web search service to a plurality of users who have accessed an online shopping search service server with respect to products registered by a plurality of product registrants or a plurality of sellers, and employing a reasonable charging method.

The foregoing discussion is to provide a background information and does not constitute an admission of prior art.

SUMMARY

The present invention provides method and system for providing an online shopping search service, which can provide a systematic and detailed search service with respect to all kinds of products in an online shopping mall by i) constructing a product database or a product information database automatically, systematically and in real time, in such a manner that a user interface for inputting product information systematically is provided to a product registrant and procedures of registering the product are performed and ii) if the product is selected by a seller, reflecting information associated with the seller or the product in the product database or the product information database automatically, systematically and in real time.

Another aspect of the present invention also provides method and system for providing an online shopping search service, which can reduce time loss and economic loss in managing an online shopping search service server by maintaining a database storing various information on products on sale at each online shopping mall using a centralized directory system.

Another aspect of the present invention also provides method and system for providing an online shopping search service, which can provide a user who wants to purchase a product with a web search service with respect to all the products in each mall by largely reducing time in constructing a database by processing product information.

Another aspect of the present invention also provides method and system for providing an online shopping search service, which can solve unbalance in charging over opening effects between online shopping mall operators and enable an online shopping search service operator to charge the shopping mall operator having a big opening effect.

One embodiment of the present invention provides a method for providing an online shopping search service, comprising the steps of: maintaining a product database including a record about identification information on a product registered by a product registrant or product information associated therewith, in which the identification information includes a product registrant identifier of the product registrant and a product identifier of the product; providing a seller with a user interface for selecting the product identifier by referring to the product database; receiving a selection of the product identifier from the seller; recording a seller identifier of the seller, URL information of a web page for sales of products which is registered by the seller and cost information transmitted from the seller in the product database, in association with the selected product identifier; receiving a search query from a user; searching for product information corresponding to the search query or URL (Uniform Resource Locator) information of a web page for sales of products associated with the product information, by referring to the product database; generating a search result list by sorting the searched product information or the URL information in accordance with the cost information associated with the searched product information; and providing the user with the generated search result list.

One embodiment of the present invention provides a system for providing an online shopping search service, comprising: a first database for maintaining a product database including a record having a field for a product registrant identifier, a product identifier or a seller identifier; a second database for maintaining a product information database including product information associated with the product identifier, URL information of a web page for sales of products associated with the seller identifier and cost information; a user interface providing means providing a seller with a user interface for selecting a product by using the product identifier or product information; a database management means recording a seller identifier of the seller in the first database in association with a product identifier of a product selected by the seller and recording URL information of a web page for sales of products associated with the seller identifier and cost information transmitted from the seller in the second database; a search query receiving means receiving a search query from a user; a search means searching for product information corresponding to the search query or URL information of a web page for sales of products associated with the product information by referring to the second database; a search result list generating means generating a search result list by sorting the searched product information or the URL information in accordance with the cost information by referring to the second database; and a search result list providing means providing the user with the generated search result list.

BRIEF DESCRIPTION OF DRAWINGS

FIG. 3 is a view illustrating one example of data recorded in a product database, in one embodiment of the present invention;

FIG. 7 is a view illustrating one example of a web page provided by an online shopping search service, in one embodiment of the present invention;

DETAILED DESCRIPTION OF EMBODIMENTS

Hereinafter, method and system for providing an online shopping search service according to an embodiment of the present invention will be fully described with reference to the accompanying drawings.

Figure 1:
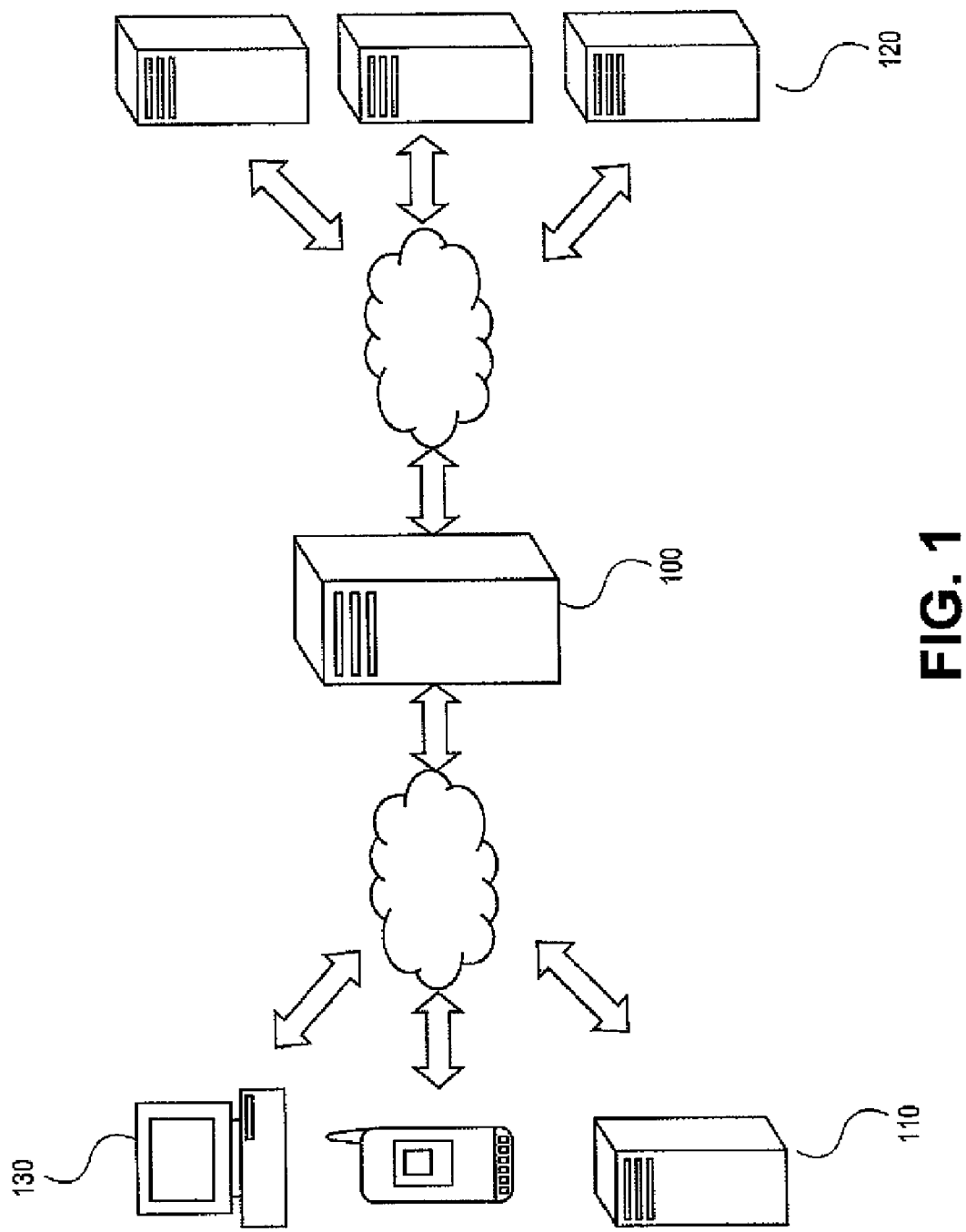
FIG. 1 is a view illustrating a network connection of a system for providing an online shopping search service, in one embodiment of the present invention.

FIG. 1 is a view illustrating a network connection of a system for providing an online shopping search service, in one embodiment of the present invention. An online shopping search service providing system 100 is connected to a terminal 110 of a product registrant, shopping mall servers 120 of sellers, or a terminal 130 of a user.

'A product registrant' used herein is the subject who registers a product to an online shopping search service providing system and in charge of distribution of the product, such as delivery of the product and the like. 'A seller' herein is the subject who selects a product registered to the online shopping search service providing system and sells the product through a predetermined online shopping mall. One subject may act as a product registrant or a seller. The seller may sell a product which is secured using another route, not the online shopping search service providing system.

Figure 2:
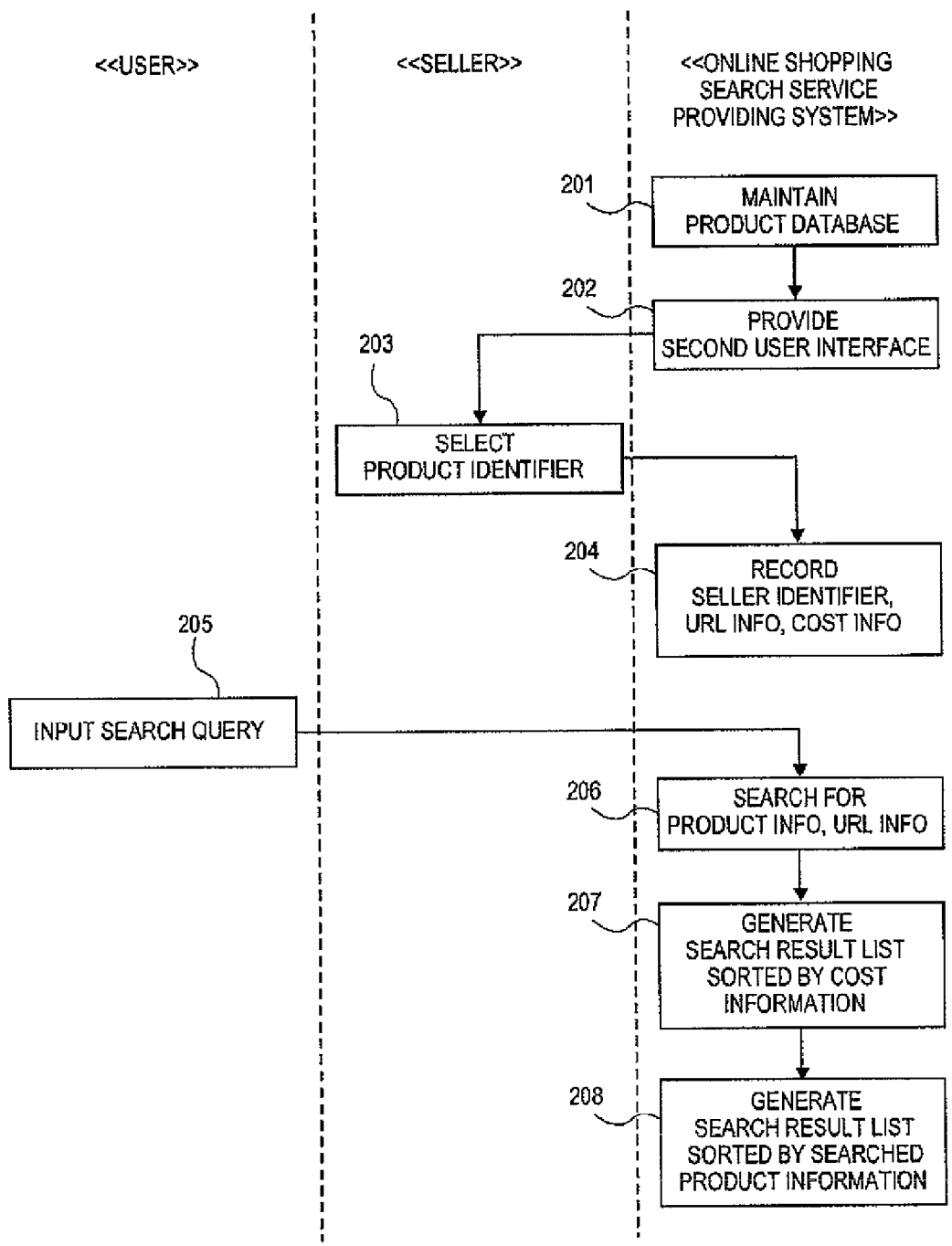
FIG. 2 is a flowchart illustrating a method for providing an online shopping search service according to one embodiment of the present invention.

FIG. 2 is a flowchart illustrating a method for providing an online shopping search service according to one embodiment of the present invention. The method for providing an online shopping search service according to the present embodiment can be performed by a predetermined online shopping search service providing system.

In step 201, the online shopping search service providing system maintains a product database. The product database includes a record about identification information on a product registered by a product registrant or product information associated with the identification information.

The identification information is information about a product registered by a product registrant. Thus, the identification information includes a product registrant identifier of the product registrant or a product identifier of the product. Also, the product database may further include a record associated with a seller identifier.

The product information is information about the product. Thus, the product information can include information on a price of the product, a category thereof, image data thereof, and the like. Further description related thereto will be described later.

FIG. 3 is a view illustrating one example of data recorded in the product database. Drawing symbol 3a is a record about identification information. Drawing symbol 3b is a record about product information associated with a product identifier or identification information. Drawing symbol 3c is a record about a seller identifier associated with the product identifier or the identification information, URL information of a web page for sales of products, and cost information transmitted from a seller. Configuration of the product database, which is configuration of a field or a record, in FIG. 3 is exemplary. Thus, it will be apparent to those skilled in the related art that a method of constructing a database can be variously selected. The database can efficiently indicate relations with identification information, a product registrant identifier, a product identifier, product information, a seller identifier, URL information of a web page for sales of products, or cost information.

The step 201 of maintaining the product database will be further fully described with reference to FIG. 4. In step 401, the online shopping search service providing system records and maintains a product register for specifying each product, in a product register database for each product. A product register which is in a type of an electronic document, can be used for the product register.

The product register is used for specifying the product by each product. For example, each of product registers exists for each of models, such as 'Exilim EX M1', 'Exilim EX M2', 'Exilim EX Z3', 'Exilim EX Z4', etc, which are digital cameras manufactured by 'casio'. Table 1 illustrates one example of the product register for 'Exilim EX M1'

TABLE 1

Exilim EX M1

| Manufacturer | casio | Pixels | 1.3 mil |
|---|---|---|---|
| Mode | normal | Memory capacity | 14 M |
| Storage method | SD card/MMC | CCD | |
| Features | | Moving pictures, voice recording; MP3 player function; USB Description . . . | |

In step 402, the online shopping search service providing system provides a product registrant with a first user interface for selecting a product register by referring to the product register database. Before performing the step 402, the online shopping search service providing system may enable a user who wants to register a product to perform an enrolling procedure for a product registrant or an authenticating procedure. Through the procedure, a product registrant identifier can be given to the product registrant.

Figures 5A, 5B:
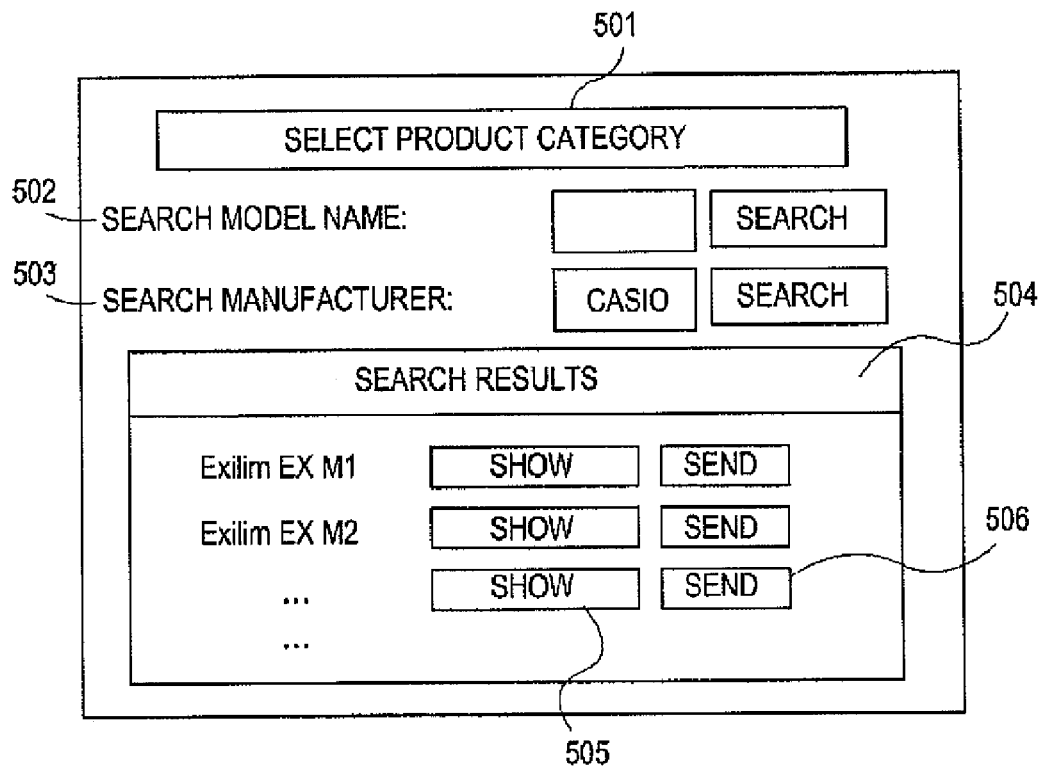
FIG. 5 is a view illustrating one example of a user interface, in one embodiment of the present invention.

For example, a web page as illustrated in FIG. 5 may be used for the first user interface. The online shopping search service providing system provides a product registrant with a web page as illustrated by drawing symbol 5a. In case that the product registrant clicks a button for 'select product category' (drawing symbol 501) using a mouse, the online shopping search service providing system can provide the product registrant with a web page through which the product registrant can select a category as illustrated by drawing symbol 5b. That is, in case that the product registrant selects a category using a mouse, the online shopping search service providing system can provide the product registrant with product registers belonging to the category or lower categories of the category and through this, enables the product registrant to search for the product registers by a category-oriented searching method.

Also, as indicated by drawing symbols 502 and 503, the online shopping search service providing system can enable the product registrant to search for the product register by using a model name of the product or a manufacturer thereof. Also, although not illustrated, the online shopping search service providing system may enable the product registrant to search for the product register by a keyword-oriented searching method.

In case that a search query is received from the product registrant by the aforementioned searching method, the online shopping search service providing system searches for a product register corresponding to the search query and generates a search result list for the searched product register. The generated search result list can be provided to the product registrant as indicated by drawing symbol 504. In step 403, the product registrant can first read product registers (or description thereabout) by clicking a 'show' button (drawing symbol 505) and later, select any wanted product register by clicking a 'send' button (drawing symbol 506).

Meanwhile, in case that there is no product register corresponding to the search query as a result of the search, the online shopping search service providing system can provide the product registrant with a user interface through which the product registrant can register a product register. At this time, in order to prevent that a plurality of product registers for the same product exist or that an unnecessary product register is generated, an operator of the online shopping search service providing system may perform a procedure of inspecting a product register received from the product registrant, before registering the product register.

In step 403, the product registrant inputs product information on a product that he/she wants to register. At this time, in case that the product register as aforementioned in the table 1 is selected, the product registrant may use product information, for example, 'pixels', included in the product register as it is, and input additional product information only.

The product information may include information on a price of the product, a category thereof, image data thereof, whether the product is genuine goods, whether an after-sale service thereof is paid or free, size or color thereof, the number thereof, a delivery method thereof and a registration date thereof and whether a gift or a point is offered to a purchaser of the product, a payment method of the product (whether a credit card or a payment by installment is available) and the like. At this time, the online shopping search service providing system may use a category of the product, image data thereof, and size or color thereof, included in the selected product register, as it is, from the product information, without receiving the same from the product registrant.

In step 404, the online shopping search service providing system generates a product identifier by using the selected product register and the received product information. That is, the online shopping search service providing system generates a product identifier associated with the selected product register and the received product information.

In step 405, the online shopping search service providing system generates identification information. The identification information includes a product registrant identifier for identifying the product registrant or the product identifier.

In step 406, the online shopping search service providing system records a record in the product database. The record includes the generated identification information and the product information. Also, the online shopping search service providing system can record only relation with the selected product register in the product database to inquire about product information included in the selected product register, without repeatedly recording the product information, recorded in the product register database in association with the product register, in the product database.

Referring to drawing symbol 3a, product registrant 'wisj-jang' has registered three kinds of products. The products are identified by product identifiers 'a11112', 'a11113' and 'a11114', respectively. A product identified by the product identifier 'a11112' (hereinafter, product 'a11112') may be a different kind of product from product 'a11113'. For example, the product 'a11112' may be clothing and the product 'a11113' may be a refrigerator.

Also, the product 'a11112' and the product 'a11113' may be the same kind of products, i.e. products associated with the same product register. Only product information between the products may be different. For example, while the product 'a11112' is digital camera 'Exilim EX M1' selling at 460,000 won and offering a paid deliver service, the product 'a11113' may be digital camera 'Exilim EX M1' selling at 470,000 won, offering a free delivery service or a gift.

Meanwhile, although the present embodiment includes the step of generating identification information including a product registrant identifier or a product identifier, the product registrant identifier or the product identifier may be respectively used without generating the identification information.

Through the aforementioned procedures, the product database can be constructed as illustrated in drawing symbol 3a or 3b. Procedures of constructing a record about the seller identifier, URL information of a web page for sales of goods, and cost information, as illustrated in Drawing symbol 3c, will be described later.

In step 202, the online shopping search service providing system provides a seller with a second user interface for selecting a product, more exactly a product identifier, by referring to the product database. Before performing the step 202, the online shopping search service providing system may enable a user who wants to select a product to perform an enrolling procedure for a seller or an authenticating procedure. Through the procedure, a seller identifier can be given to the seller.

For example, the online shopping search service providing system enables the seller to select a product by using a keyword-oriented searching method or a category-oriented searching method. Also, it may enable the seller to search by using an appropriate search query for each category. For example, in case that the seller selects a category of digital cameras, the online shopping search service providing system can provide the seller with a web page for inputting a search query, as illustrated in FIG. 6.

As indicated by drawing symbol 601, the online shopping search service providing system enables a seller to select a category of 'digital cameras' using a category-oriented searching method. Also, as indicated by drawing symbol 602, online shopping search service providing system can provide the seller with a user interface for inputting a search query, such that through the user interface, the seller can easily search for a wanted digital camera in the category.

The user interface as indicated by drawing symbol 602 may be determined differently for each category. For example, in a 'formal attire' category, the user interface can be set to enable the seller to input a selection of 'one piece/two piece/three piece suite', 'size', 'price', and the like.

Figure 6A:
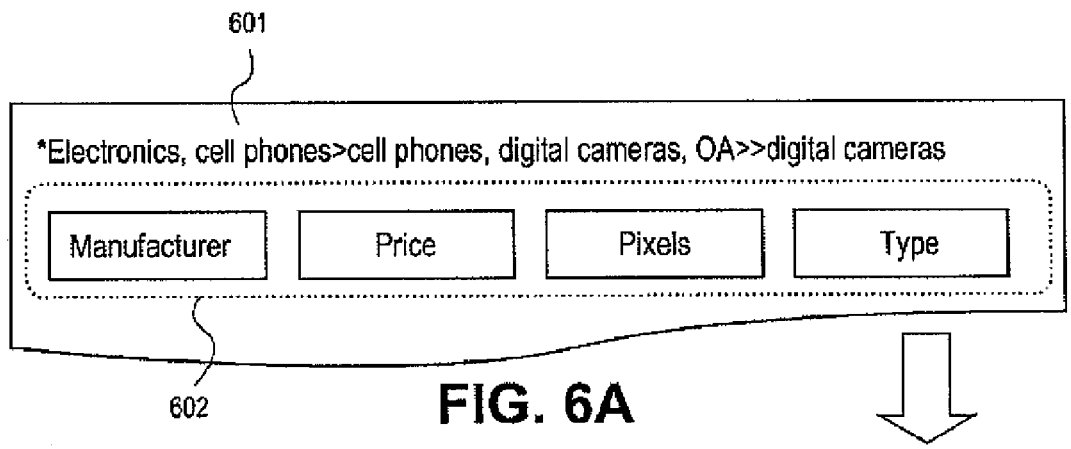
FIG. 6 is a view illustrating one example of a user interface enabling a seller to input a search query for searching a product, in one embodiment of the present invention.
Figure 6B:
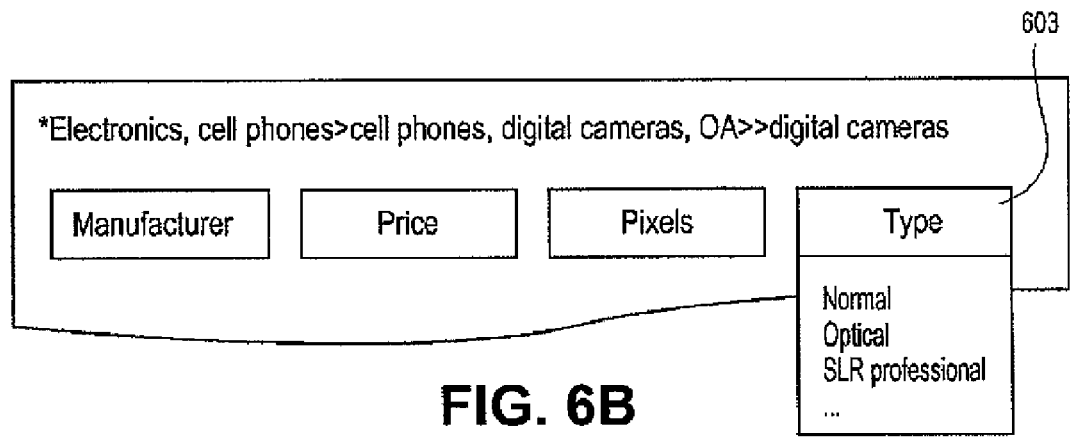

In case that the seller clicks a 'type' button (drawing symbol 603) using a mouse, the online shopping search service providing system enables the seller to select a type of digital cameras, as illustrated in (b) of FIG. 6. In case that the seller selects 'normal type' through a mouse click or the like, a list of product information about general digital cameras among product information recorded in the product database is provided to the seller.

In step 203, the seller confirms the provided list of product information and selects a product identifier associated with product information. Specifically, in case that the seller selects product information from the product information list, a product identifier associated with the product information can be embodied to be selected.

Figure 4:
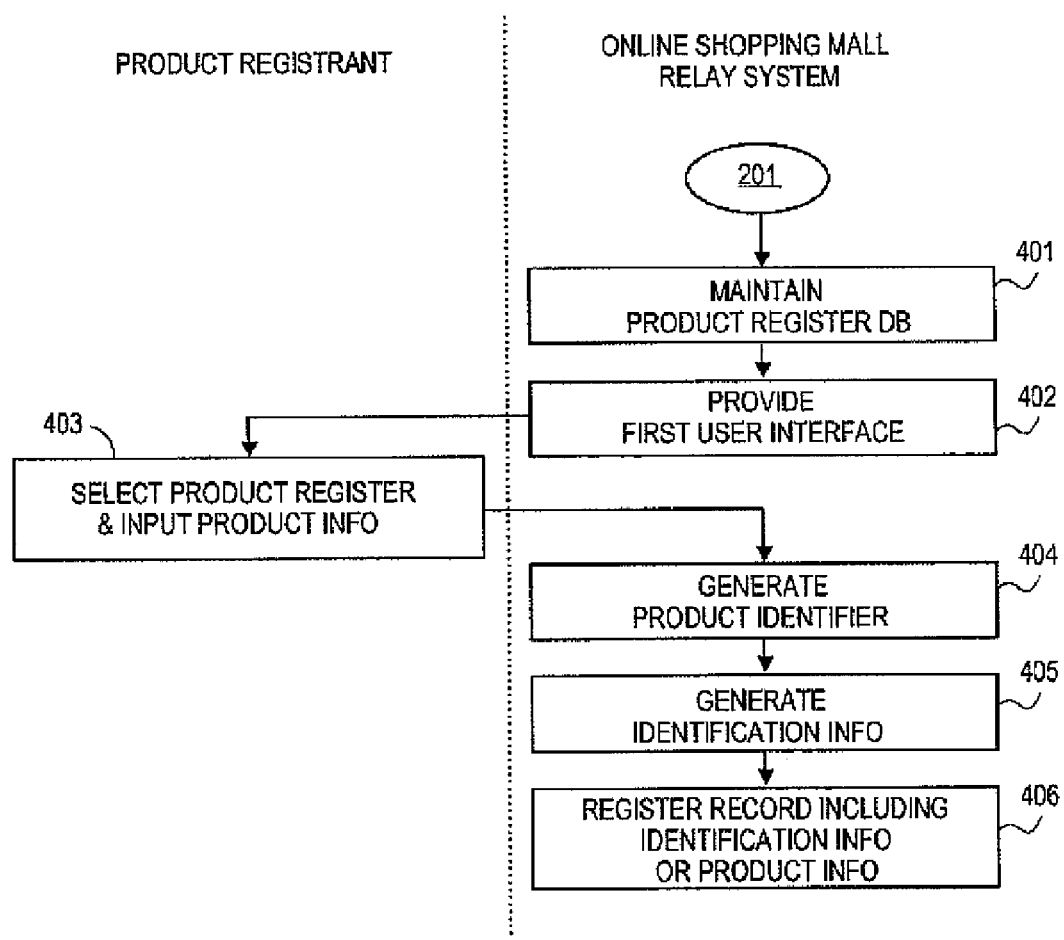
FIG. 4 is a flowchart for explaining procedures of maintaining a product database, in one embodiment of the present invention.

As described by referring to FIG. 4, the online shopping search service providing system embodies the first user interface, such that 1) a product is registered for each product register and product information for each category is inputted. Thus, each of data such as product information and the like can be systematically recorded in the product database.

Accordingly, the online shopping search service providing system enables the seller to input various search queries easily for each category by referring to the product database. On the other hand, the online shopping search service providing system provides the seller with exact search results.

In step 204, the online shopping search service providing system records a seller identifier of the seller, URL information of a web page for sales of products registered by the seller and cost information transmitted from the seller, in the product database in association with the selected product identifier.

At this time, the URL information is URL information of a web page for sales of products where a product associated with the product identifier is being sold among web pages provided at a shopping mall server of the seller.

Also, the cost information may be information about a fee or commission which the seller has paid or will pay to an operator of the online shopping search service enabling the seller to select a product registered to the online shopping search service providing system and to sell the selected product through a predetermined online shopping mall. In addition, the cost information may be advertising costs which the seller has paid or will pay to the operator of the online shopping search service in order to advertiser his/her online shopping mall.

According to one embodiment of the present invention, there is provided a method for providing an online shopping search service, in which the online shopping search service providing system performs the step of receiving information on a selling period of a product associated with the selected product identifier from the seller and the cost information is determined based on the selling period. According to the present embodiment, the seller is enabled to pay in accordance with the length of a period during which the selected product is sold. Thus, it is possible to construct a more reasonable charging system.

Through the above procedures, a record as illustrated in drawing symbol 3c can be generated. Also, the online shopping search service providing system can record URL information of the web page for sales of products and the cost information in association with the product identifier and the seller identifier.

Hereinafter, procedures of providing a user with an online shopping search service will be described with reference to the product database. The online shopping search service providing system can provide an online shopping search service of a keyword-oriented searching method or a category-oriented searching method, which enables a user to request a search by inputting a search keyword or selecting a category. Also, the online shopping search service providing system provides the user with the user interface as illustrated in FIG. 6, and may enable the user to input a search query maximized for each category. In step 205, the user inputs a search query in the online shopping search service providing system by using the aforementioned method or other various methods.

In step 206, the online shopping search service providing system searches for product information corresponding to the search query by referring to the product database or searches for URL information of a web page for sales of products associated with the product information.

In step 207, the online shopping search service providing system generates a search result list by sorting the searched product information or the URL information in accordance with cost information associated with the searched product information, by referring to the product database. According to one embodiment of the present invention, the online shopping search service providing system can sort the searched product information or the URL information in ascending or descending of the cost information in step 207.

In step 208, the online shopping search service providing system generates a search result list by sorting the searched product information or the URL information.

According to configuration such constructed, users can be provided with an integrative online shopping search service for products being sold at each online shopping mall by accessing the online shopping search service providing system.

In case that an online shopping mall is connected with an online shopping search service providing system and an online shopping search service for products being sold at the online shopping mall is provided to users, the online shopping search service is being operated for some items of products only.

In order to provide an online shopping search service of the above type, an operator of an online shopping search service providing system is provided with product information data, which includes information about products being sold at the shopping mall server, from a database of each shopping mall server. However, , configuration of the database provided at each shopping mall server is different for each online shopping mall. Thus, the operator should perform procedures of constructing a product database, required to provide an online search service in the online search service providing system, by referring to the database manually one by one.

However, as aforementioned, according to an embodiment of the present invention, the product database can be automatically constructed in the online shopping search service providing system, while a product registrant inputs product information including price information of a product and registers the product and a seller selects the registered product.

That is, since a product registrant registers a product by using a user interface provided at the online shopping search service providing system, data associated with each of product registrants is recorded in the product database in the same or similar structure. Thus, the product database can systematically manage relation of the product registrant, product information on the product registered by the product registrant, and a seller who selects the product. In these aspects, a method for providing an online shopping search service according to an embodiment of the present invention can provide a user with an online shopping search service for the entire shopping malls.

Hereinafter, in providing a user with an online shopping search service for a product according to an embodiment of the present invention, embodiments capable of additionally providing a product registrant or a seller with a predetermined premium service will be described.

In a method for providing an online shopping search service according to one embodiment of the present invention, the step 206 may include the step of searching for second product information or second URL information of a web page for sales of products associated with the second product information.

The step 207 may include the step of generating a second search result list by sorting the searched second product information or second URL information. The step 208 may include the step of controlling the generated second search result list to be exposed on a predetermined location of a web page to be provided to the user. Also, the step 208 may further include the step of indicating predetermined display information in the generated second search result list.

In a method for providing an online shopping search service according to the present embodiment, an online shopping search service for products is basically provided. Also, product information and URL information satisfying a predetermined criterion can be provided to a user in a different type from a general search result list. For example, a special room can be prepared on a web page provided to a user terminal, such as "a room for recommending products", "a room for recommending shopping malls", "a sponsor link", or the like. The second search result list can be provided to the special room. Also, at the same time, it is possible to indicate advertising such as "AD" with respect to items included in the second search result list, as the display information, or to indicate recommendation such as "recommending shopping malls".

Meanwhile, in a method for providing an online shopping search service according to another embodiment of the present invention, the step 206 includes the step of searching for second product information or second URL information of a web page for sales of products associated with the second product information. The step 208 includes the steps of indicating predetermined display information in a particular item of the generated search result list and providing the user with the search result list having the display information. At this time, the particular item is an item associated with the searched second product information or second URL information.

In a method for providing an online shopping search service according to the present embodiment, an online shopping search service for products is basically provided. Also, product information and URL information satisfying a predetermined criterion can be provided to a user, in which predetermined display information is added in a search result list. For example, it is possible to indicate advertising such as "AD" in the search result list, as the display information, or to indicate recommendation such as "recommending shopping malls".

FIG. 7 is a view illustrating one example of a web page provided by an online shopping search service according to the embodiment capable of providing a predetermined premium service additionally. As illustrated in FIG. 7, it is possible to generate a separate list of products provided at a shopping mall and to expose the list on an upper portion of a web page where online shopping search results are provided. At the same time, it is also possible to expose the list in a different type from other lists by adding display information such as "AD" or the like. Also, it is possible to make display information different in a general search result list, by using an indication of "recommending shopping malls" or the like. The web page illustrated in FIG. 7 is exemplary. A method of efficiently displaying product information can be selected variously.

According to one embodiment of the present invention, there is provided a method for providing an online shopping search service in which the online shopping search service providing system further performs the step of maintaining a second database, and the second database includes information on the number of inputted selections from a second user for the product information or the URL information, and the second product information and the second URL information is product information and URL information of which the information on the number of inputted selections exceeds a predetermined numerical value. According to the present embodiment, product information or URL information of which the number of inputted selections by other users using a click or the like is high can be provided to a user. Thus, there is an effect that it is possible to satisfy desire of the user who wants to be provided with popular product information through the online search service.

Also, according to one embodiment of the present invention, there is provided a method for providing an online shopping search service in which the online shopping search service providing system further performs the step of maintaining a second database, and the second database includes information on the number of exposures of the product information or the URL information to a second user, and the second product information and the second URL information is product information and URL information of which the information on the number of exposures exceeds a predetermined numerical value. According to the present embodiment, product information or URL information which is more frequently exposed to other users because of the high number of times corresponding to search queries inputted by other users can be provided to a user. Thus, there is an effect that it is possible to satisfy desire of the user who wants to be provided with popular product information through the online search service.

Also, according to one embodiment of the present invention, there is provided a method for providing an online shopping search service in which the online shopping search service providing system further performs the step of maintaining a second database, and the second database includes information on the number of inputted selections from a second user for the product information or the URL information, and information on the number of exposures of the product information or the URL information to the second user, and the second product information and the second URL information is product information and URL information of which the information on the number of inputted selections over the information on the number of exposures exceeds a predetermined numerical value. According to the present embodiment, product information or URL information of which the number of inputted selections is high in comparison with the number of exposures to other users can be provided to a user. Thus, there is an effect that it is possible to satisfy desire of the user who wants to be provided with product information frequently selected by the public.

Also, according to one embodiment of the present invention, there is provided a method for providing an online shopping search service in which the online shopping search service providing system further performs the step of maintaining a second database, and the second database includes information on the number of inputted selections from a second user with respect to the product information or the URL information and information on the quantity of sold products with respect to a product associated with the product information and the second product information and the second URL information is product information and URL information of which the information on the quantity of sold products over the information on the number of inputted selections exceeds a predetermined numerical value. Although product information or URL information is selected frequently, there may be no substantial purchasing. Thus, according to the present embodiment, there is an effect that it is possible to satisfy desire of a user who wants to be provided with product information associated with a product which is being purchased at high frequency by the public.

Also, according to one embodiment of the present invention, there is provided a method for providing an online shopping search service in which the second product information and the second URL information is associated with a product that a second seller sells; and the second seller is a seller who has transmitted cost information exceeding a predetermined standard amount. The standard amount can be determined in advance by a service operator. According to the present embodiment, sellers who want to provide their product information to users pay more to the service operator. Thus, there is an effect that it is possible to improve profits that the service operator can obtain by providing of service.

According to another embodiment of the present invention, there is provided a method for providing an online shopping search service in which online shopping search results are sorted in accordance with the number of times that product information is selected by users, the number of times that the product information is exposed to users, or the quantity of sold products. Hereinafter, this embodiment will be described.

Figure 8:
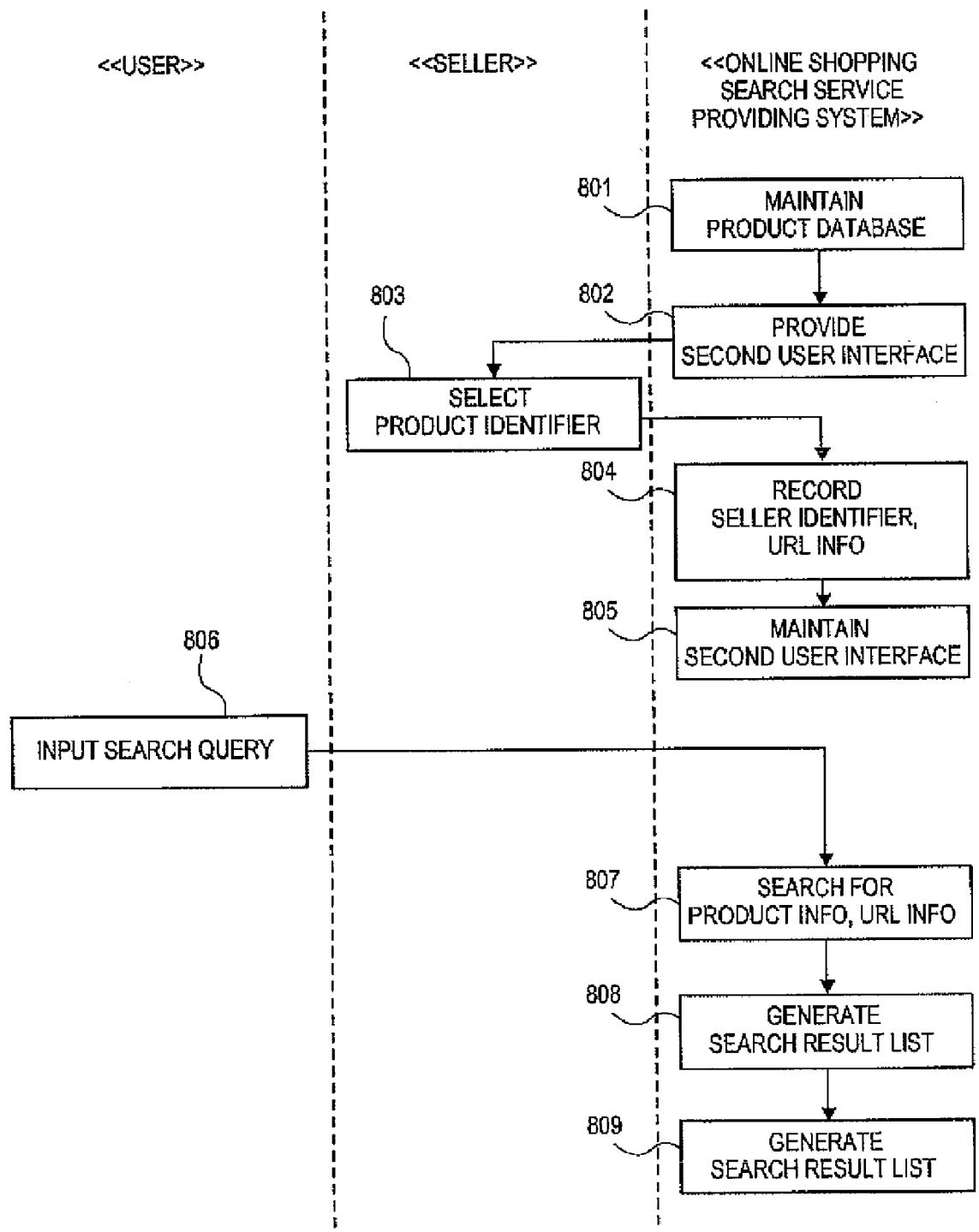
FIG. 8 is a flowchart illustrating a method for providing an online shopping search service according to another embodiment of the present invention.

FIG. 8 is a flowchart illustrating a method for providing an online shopping search service according to one embodiment of the present invention. The method for providing an online shopping search service according to the present embodiment is performed by a predetermined online shopping search service providing system.

The online shopping search service providing system performs steps 801 to 809. At this time, the steps 801 to 803, steps 806 and 807, and step 809 correspond to steps 201 to 203, steps 205 and 206, and step 208 in FIG. 2, respectively. Thus, further description related thereto will be omitted and the other steps will be described.

In step 804, the online shopping search service providing system records a seller identifier of a seller or URL information of a web page for sales of products registered by the seller in a product database in association with a selected product identifier.

In step 805, the online shopping search service providing system maintains a second database. The second database includes information on the number of inputted selections from a first user with respect to product information or URL information of a web page for sales of products associated with the product information.

In step 808, the online shopping search service providing system generates a search result list by sorting searched product information or URL information in accordance with the number of inputted selections by referring to the second database.

By performing the above steps, the online shopping search service providing system can provide a second user with product information which is sorted in ascending or descending of information on the number of inputted selections. Thus, it is possible to satisfy desire of the second user who wants to be provided with product information of which the number of inputted selections is high.

According to one embodiment of the present invention, there is provided a method for providing an online shopping search service in which the information on the number of inputted selections is generated by counting the number of times that the product information or the URL information of a web page for sales of products associated therewith is selected by the first user during a predetermined time interval, and in step 808 the online shopping search service providing system generates the search result list by sorting only product information or URL information of which the information on the number of inputted selections exceeds a predetermined numerical value, from the searched product information or the URL information by referring to the second database. According to the present embodiment, since product information of which the number of inputted selections does not reach a predetermined numerical value during a certain period is not included in a search result list, it is possible to control the number of listings of online shopping search results automatically. Thus, there is an effect that a user is provided with the appropriate number of search listings only and can save time fining out wanted product information.

Also, according to one embodiment of the present invention, there is provided a method for providing an online shopping search service in which the online shopping search service providing system further includes the step of generating charging information with respect to a product registrant or a seller in accordance with the information on the number of inputted selections by referring to the second database. According to the present embodiment, since a product registrant or a seller is charged based on how much users are interested in a product registered by the product registrant or sold by the seller, a more reasonable charging system can be constructed.

According to another embodiment of the present invention, there is provided a method for providing an online shopping search service, providing product information by sorting the same in accordance with the number of times that the product information is exposed to a user.

In step 805, the online shopping search service providing system maintains a second database. The second database includes information on the number of exposures of the product information or URL information of a web page for sales of products associated therewith to a first user. In step 808, the online shopping search service providing system generates a search result list by sorting the searched product information or URL information in accordance with the information on the number of exposures by referring to the second database.

By performing the above steps, the online shopping search service providing system can provide a second user with product information which is sorted in ascending or descending of information on the number of exposures. Thus, it is possible to satisfy desire of the second user who wants to be provided with product information of which the number of exposures is high.

According to one embodiment of the present invention, there is provided a method for providing an online shopping search service in which the information on the number of exposures is generated by counting the number of times that the product information or the URL information of a web page for sales of products associated therewith is exposed to the first user during a predetermined time interval; and in step 808, the online shopping search service providing system generates the search result list by sorting only product information or URL information of which the information on the number of exposures exceeds a predetermined numerical value from the searched product information or the URL information by referring to the second database. According to the present embodiment, since product information of which the number of exposures does not reach a predetermined numerical value during a certain period is not included in a search result list, it is possible to control the number of listings of online shopping search results automatically. Thus, there is an effect that a user is provided with the appropriate number of search listings only and can save time fining out wanted product information.

Also, according to one embodiment of the present invention, there is provided a method for providing an online shopping search service in which the online shopping search service providing system further includes the step of generating charging information with respect to a product registrant or a seller in accordance with the information on the number of exposures by referring to the second database. According to the present embodiment, since a product registrant or a seller is charged based on how much users are interested in a product registered by the product registrant or sold by the seller, a more reasonable charging system can be constructed.

According to another embodiment of the present invention, there is provided a method for providing an online shopping search service, providing online shopping search results in accordance with the quantity of sold products.

In step 805, the online shopping search service providing system according to the present embodiment maintains a second database. The second database includes information on the quantity of sold products with respect to the product, in association with the seller identifier or URL information of a web page for sales of products registered by the seller. In step 808, the online shopping search service providing system generates a search result list by sorting the searched product information or URL information in accordance with the information on the quantity of sold products by referring to the second database.

By performing the above steps, the online shopping search service providing system can provide a user with product information which is sorted in ascending or descending of information on the quantity of sold products. Thus, it is possible to satisfy desire of the user who wants to be provided with product information of which the number of sold products is high.

According to one embodiment of the present invention, there is provided a method for providing an online shopping search service in which the online shopping search service providing system generates a web page for sales of products in association with a shopping mall site of a seller and in case that purchasing is completed through the web page, the information on the quantity of sold products can be generated by receiving payment information.

Figure 9:
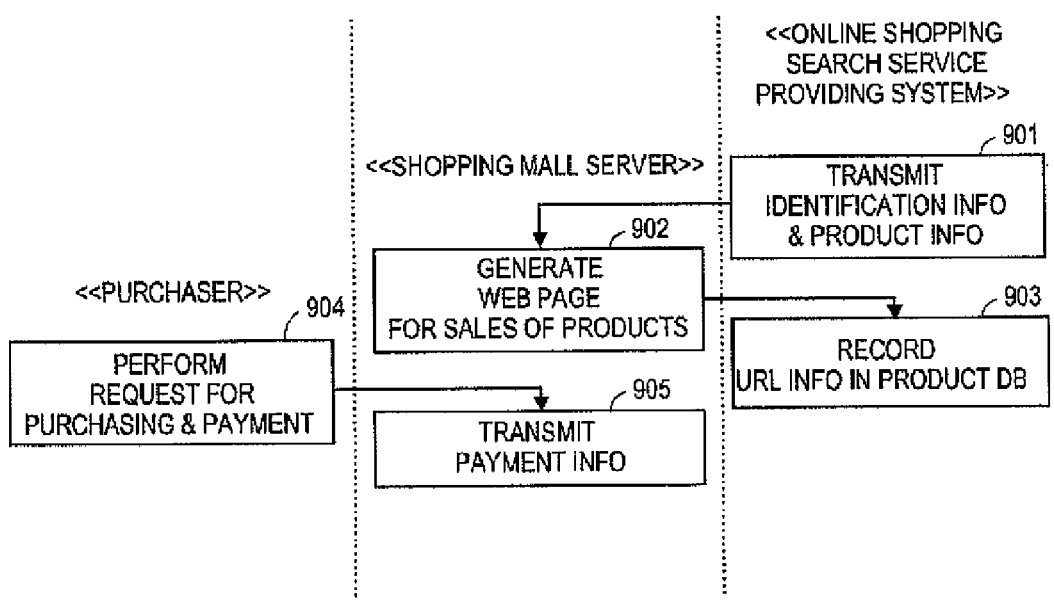
FIG. 9 is a flowchart illustrating procedures of generating a web page for sales of products and performing a payment through the web page, in one embodiment of the present invention.

FIG. 9 is a flowchart illustrating procedures of generating a web page for sales of products and performing a payment through the web page according to the present embodiment. In step 901, the online shopping search service providing system transmits identification information and product information associated with a selected product identifier, to a shopping mall server supporting a shopping mall site of the seller.

In step 902, the online shopping search service providing system generates a web page for sales of products with respect to a product associated with the selected product identifier in association with the shopping mall site, by using the transmitted identification information and product information. In this case, since the identification information and the product information are standardized, a program can be used and the program enables the web page for sales of products to be generated automatically by using the identification information and the product information. Also, the product information can be displayed on the web page for sales of products. The shopping mall server can store the identification information in association with the web page for sales of products.

The present embodiment generates the web page for sales of products by using identification information or product information recorded in the product database as it is. Thus, according to the present embodiment, data is recorded in a database of the shopping mall server, in the same or similar structure to the product database. In this aspect, a method for providing an online shopping search service according to the present embodiment can provide an online shopping search service for the entire shopping malls.

Step 903 corresponds to step 804. In this step, the online shopping search service providing system records URL information of the generated web page for sales of products in the product database.

In case that a request for purchasing and a payment is made for the product by a purchaser accessing the web page for sales of products in step 904, the shopping mall server transmits payment information on the payment to the online shopping search service providing system in step 905. In this case, the payment information includes the identification information on the product and purchasing information on the number of purchased products. Also, the payment information may include information on a purchasing price of the product, information on a delivery place thereof, and the like.

In this case, the online shopping search service providing system can identify a product registrant who has registered a product on sale at the web page for sales of products, by using identification information included in the transmitted payment information. Also, the online shopping search service providing system can generate information on the quantity of sold products in relation to how many the products are being sold, by using the number of times that payment information including identification information on the product is transmitted and purchase information on the number of purchased products included in the payment information.

According to the present embodiment, the online shopping search service providing system can generate information on rankings of sold products based on the information on the quantity of sold products and store the generated information on rankings of sold products in a predetermined database. The online shopping search service providing system can generate a search result list by sorting searched product information or URL information in accordance with the information on rankings of sold products, and provide a user with the generated search result list. In this case, the online shopping search service providing system can sort the searched product information or the URL information in ascending or descending of the information on rankings of sold products. According to the present embodiment, it is possible to provide an online shopping search service providing method, enabling a user to select and purchase a product more conveniently by providing the user with product information associated with a popular product of which unit sales is good.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts.

Figure 10:
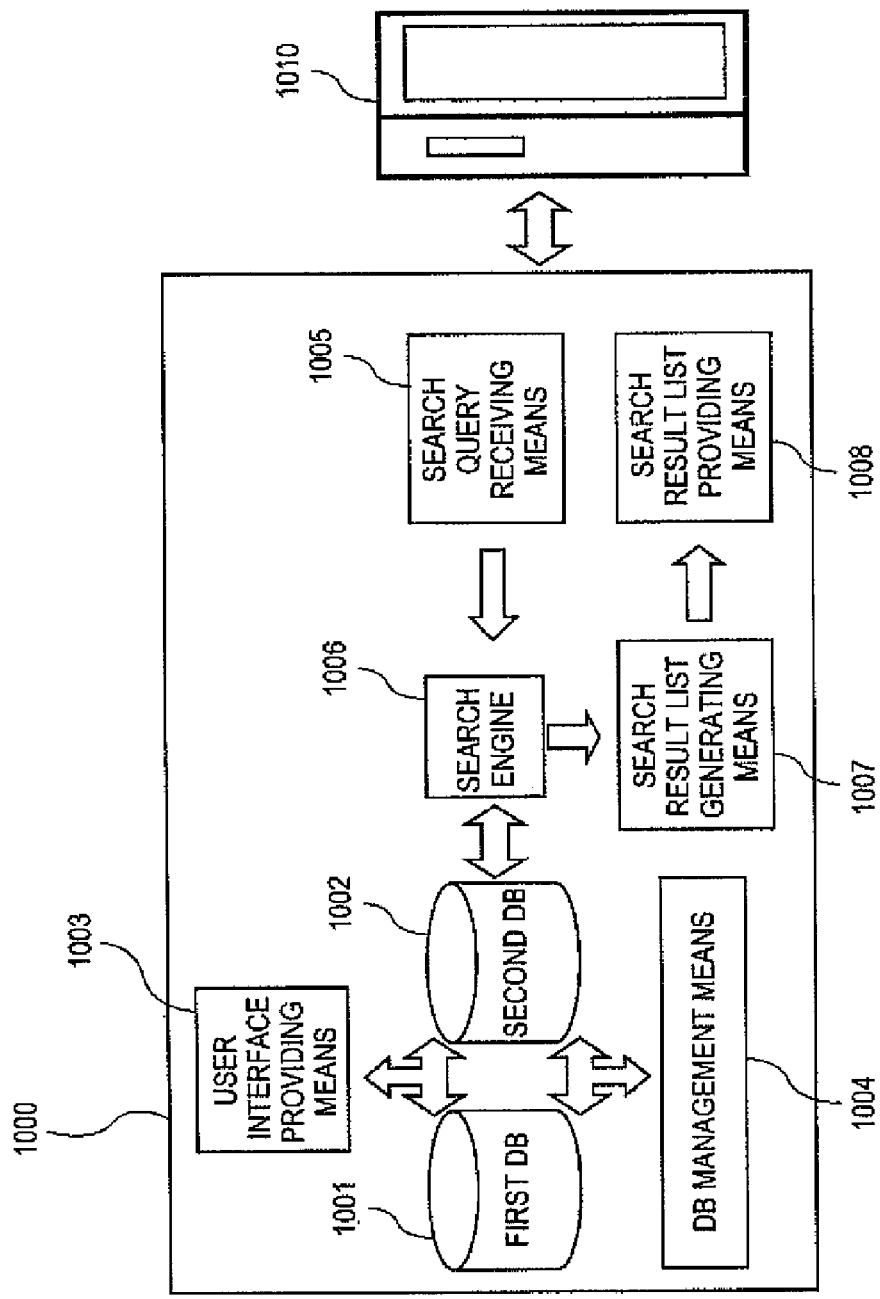
FIG. 10 is a block diagram illustrating a system for providing an online shopping search service according to another embodiment of the present invention.

Hereinafter, a system for providing an online shopping search service according to another embodiment of the present invention will be described. FIG. 10 is a block diagram illustrating the online shopping search service providing system according to the present embodiment.

An online shopping search service providing system 1000 according to the present embodiment includes a first database 1001, a second database 1002, a user interface providing means 1003, a database management means 1004, a search query receiving means 1005, a search means 1006, a search result list generating means 1007, and a search result list providing means 1008.

The first database 1001 maintains a product database. The product database includes a record having a field for a product registrant identifier, a product identifier or a seller identifier.

The second database 1002 maintains a product information database. The product information database includes product information associated with the product identifier, URL information of a web page for sales of products associated with the seller identifier and cost information.

The product registrant identifier is used for identifying a product registrant who registers a product by inputting product information in the product information database. The product identifier is used for identifying a product associated with product information inputted by the product registrant. The seller identifier is used for identifying a seller who selects a product by using product information registered in the product information database and sells the selected product.

Also, the cost information may be information about a fee or commission which the seller has paid or will pay to an operator of the online shopping search service enabling the seller to select a product registered to the online shopping search service providing system and to sell the selected product through a predetermined online shopping mall. In addition, the cost information may be advertising costs which the seller has paid or will pay to the operator of the online shopping search service in order to advertiser his/her online shopping mall.

A seller can inquire about product information recorded in the product information database by using a user interface provided by the user interface providing means 1003. The user interface providing means 1003 may provide a user interface through which the seller searches for the product information. At this time, the online shopping search service providing system 1000 further includes a search engine (not illustrated). As aforementioned in the above embodiment, the online shopping search service providing system 1000 can provide a search service using various searching methods such as a keyword-oriented searching method, a category-oriented searching method, and the like. At this time, the online shopping search service providing system 1000 may further include a search engine (not illustrated).

The seller selects a product which is on sale under a predetermined condition, by referring to product information using the user interface.

The database management means 1004 records a seller identifier of the seller in the first database 1001 in association with a product identifier of a product selected by the seller and records URL information of a web page for sales of products associated with the seller identifier and cost information transmitted from the seller in the second database 1002.

According to one embodiment of the present invention, the online shopping search service providing system 1000 can transmit the selected product information and a product identifier associated with the product information and a product registrant identifier to a shopping mall server (not illustrated) of the seller. The shopping mall server can generate a web page for sales of products for selling a product associated with the product information by using the same. In this case, the product identifier, or the product registrant identifier is stored in the shopping mall server in association with the web page for sales of products.

The search query receiving means 1005 receives a search query from a user through a user terminal 1010. The search means 1006 searches for product information corresponding to the search query or URL information of a web page for sales of products associated with the product information by referring to the second database 1002.

The search result list generating means 1007 generates a search result list by sorting the searched product information or the URL information in accordance with the cost information by referring to the second database 1002. The search result list providing means 1008 provides the user with the generated search result list through the user terminal 1010.

Figure 11:
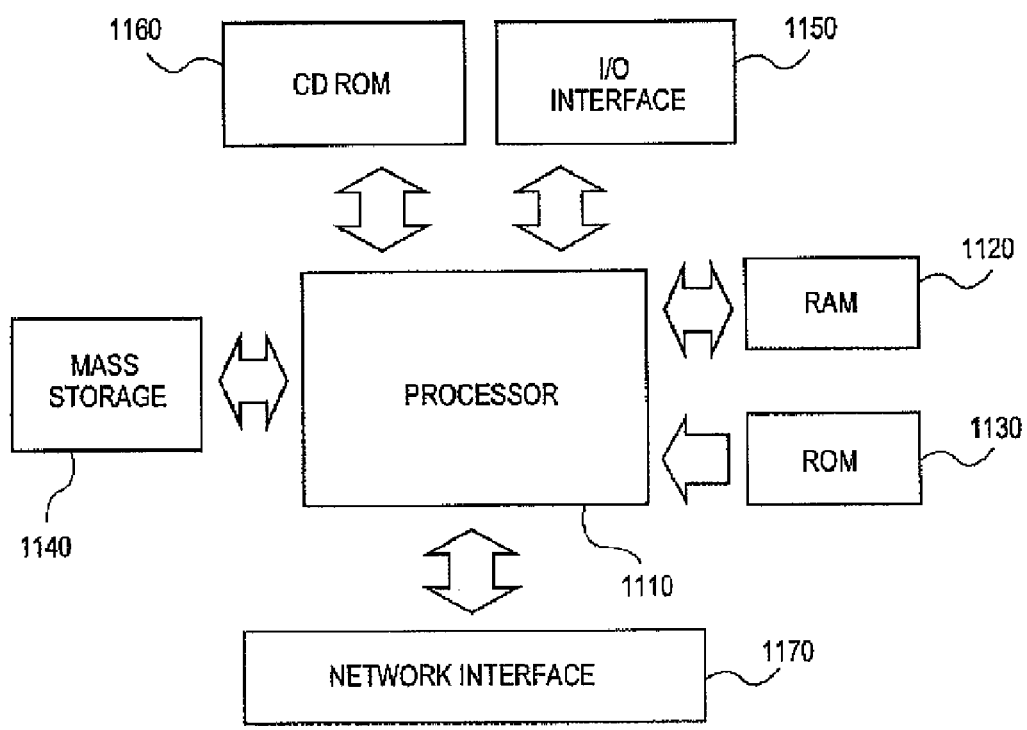
FIG. 11 is an inner block diagram of a general-purpose computer which can be employed in implementing a method for providing an online shopping search service according to another embodiment of the present invention.

FIG. 11 is an inner block diagram of a general-purpose computer which can be employed in implementing a method for providing an online shopping search service according to an embodiment of the present invention.

The computer system 1100 includes any number of processors 1110 (also referred to as central processing units, or CPUs) that are coupled to storage devices including primary storage (typically a random access memory, or "RAM 1120"), primary storage (typically a read only memory, or "ROM 1130"). As is well known in the art, ROM 1130 acts to transfer data and instructions uni-directionally to the CPU and RAM 1120 is used typically to transfer data and instructions in a bi-directional manner. Both of these primary storage devices may include any suitable type of the computer-readable media described above. A mass storage 1140 is also coupled bi-directionally to CPU and provides additional data storage capacity and may include any of the computer-readable media described above. The mass storage 1140 may be used to store programs, data and the like and is typically a secondary storage medium such as a hard disk that is slower than primary storage. A specific mass storage device such as a CD-ROM 1160 may also pass data uni-directionally to the CPU. Processor 1110 is also coupled to an interface 1150 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1110 optionally may be coupled to a computer or telecommunications network using a network connection as shown generally at a network interface 1170. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

According to method and system for providing an online shopping search service according to an embodiment of the present invention, it is possible to provide a systematic and detailed search service with respect to all kinds of products in an online shopping mall by constructing a product database or a product information database automatically, systematically and in real time, in such a manner that a user interface for inputting product information systematically is provided to a product registrant and procedures of registering the product are performed and by reflecting information associated with the seller or the product in the product database or the product information database automatically, systematically and in real time.

Also, according to method and system for providing an online shopping search service according to an embodiment of the present invention, it is possible to reduce time loss and economic loss in managing an online shopping search service server by maintaining a database storing various information on products on sale at each online shopping mall using a centralized directory system.

Also, according to method and system for providing an online shopping search service according to an embodiment of the present invention, it is possible to provide a user who wants to purchase a product with a web search service with respect to all the products in each mall by largely reducing time in constructing a database by processing product information.

Also, according to method and system for providing an online shopping search service according to an embodiment of the present invention, it is possible to solve unbalance in charging over opening effects between online shopping mall operators and enable an online shopping search service operator to charge the shopping mall operator having a big opening effect.

What is claimed is:

1. A method of providing a search service to a shopper by an on-line shopping mall comprising a plurality of on-line shops, wherein the on-line shops are operated by sellers that sell registered products in their respective on-line shops, the method comprising:

receiving, from a terminal associated with a shopper, a search query for a product;

conducting a search in reply to the search query and locating a plurality of on-line shops, associated with the on-line shopping center, that sell the product specified in the search query;

determining a set of search results for the search query, wherein the search results comprise data indicating which on-line shops sell the product specified in the search query and wherein the search results are displayed in an order that is based on respective lengths of time during which each shop has been registered with the on-line shopping center; and transmitting data for displaying the search result view to the terminal associated with the shopper.

2. The method of claim 1, wherein determining the set of search results comprises sorting the results based on a price of the product at each on-line shop.

3. The method of claim 2, wherein determining the set of search results comprises sorting the results based on the price of the product at each on-line shop and based on on-line shops having the same selling period.

4. The method of claim 2, wherein determining the set of search results comprises sorting the results based on grouping the on-line shops having the same price for the product.

5. The method of claim 1, wherein the information of each on-line shop to be included in the search results comprises a price of the product and a link to a web page of the on-line shop.

6. The method of claim 5, wherein the information to be included in the search results further comprises at least one of an image of the product and a description of the product.

7. The method of claim 1, wherein each of the plurality of on-line shops comprises a web page that provides information about the product and is associated with the on-line shopping mall.

8. The method of claim I, wherein the on-line shopping mall comprises a web page configured for searching the product and a web site configured for purchasing the product.

9. The method of claim 1, wherein the plurality of on-line shops comprises a first on-line shop having a first selling period for the product and a second on-line shop having a second selling period for the product that is longer than the first period, and wherein in the search results, information about the second on-line shop is placed higher in the sorted order relative to the information about the first on-line shop.

10. The method of claim 9, wherein the information about the second on-line shop is displayed above the information about the first on-line shop on a screen.

11. A method of providing a search service to a shopper by an on-line shopping mall comprising a plurality of on-line shops, wherein the on-line shops are operated by sellers that sell registered products in their respective on-line shops, the method comprising:

receiving, from a terminal associated with a shopper, a search query for a product;

conducting a search in reply to the search query and locating a plurality of on-line shops associated with the on-line shopping mall, that sell the product specified in the search query;

determining a set of search results for the search query, wherein an order in which the on-line shops appear in the search results are sorted based on a number of previous times that each on-line shop was displayed in previous search results; and transmitting data for displaying the search result view to the terminal associated with the shopper.

12. A method of providing a search service to a shopper by an on-line shopping mall comprising a plurality of on-line shops, wherein the on-line shops are operated by sellers that sell registered products in their respective on-line shops, the method comprising:

receiving, from a terminal associated with a shopper, a search query for a product;

conducting a search in reply to the search query and locating a plurality of on-line shops, associated with the on-line shopping mall, that sell the product specified in the search query;

determining a set of search results for the search query, wherein an order in which the on-line shops appear in the search results are sorted based on a number of times a web page of each on-line shop has been opened from previous search results; and transmitting data for displaying the search result view to the terminal associated with the shopper.

13. A method of providing a search service to a shopper by an on-line shopping mall comprising a plurality of on-line shops, wherein the on-line shops are operated by sellers that sell registered products in their respective on-line shops, the method comprising:

receiving, from a terminal associated with a shopper, a search query for a product;

conducting a search in reply to the search query and locating a plurality of on-line shops associated with the on-line shopping mall, that sell the product specified in the search query;

determining a set of search results for the search query, wherein an order in which the on-line shops appear in the search results are sorted based on an amount of previous sales transactions that each on-line shop conducted via the on-line shopping mall; and transmitting data for displaying the search result view to the terminal associated with the shopper.

* * * * *

UNITED STATES PATENT AND TRADEMARK OFFICE
CERTIFICATE OF CORRECTION

| | | |
|---|---|---|
| PATENT NO. | : 7,756,754 B2 | Page 1 of 1 |
| APPLICATION NO. | : 11/593325 | |
| DATED | : July 13, 2010 | |
| INVENTOR(S) | : Ha | |

It is certified that error appears in the above-identified patent and that said Letters Patent is hereby corrected as shown below:

In Column 9, Line 58, please change "However,," to -- However, --.

In Column 13, Line 36, please change "fining" to -- for finding --.

In Column 14, Line 23, please change "fining" to -- for finding --.

In Column 19, Line 24 of Claim 8, please change "I," to -- 1 --.

In Column 19, Line 25 of Claim 8, after "searching" insert -- for --.

Signed and Sealed this
Fifteenth Day of March, 2011

David J. Kappos
*Director of the United States Patent and Trademark Office*